United States Patent [19]

Kanbe

[11] Patent Number: 4,646,552
[45] Date of Patent: Mar. 3, 1987

[54] PROCESS FOR MANUFACTURING UNIVERSAL JOINT

[75] Inventor: Yoshihiko Kanbe, Sagamihara, Japan

[73] Assignee: Aida Engineering, Ltd., Sagamihara, Japan

[21] Appl. No.: 561,518

[22] Filed: Dec. 14, 1983

[30] Foreign Application Priority Data

Dec. 27, 1982 [JP] Japan .................. 57-232566

[51] Int. Cl.⁴ .................. B21D 53/26; F16C 11/06
[52] U.S. Cl. .................. 72/379; 29/175 A; 403/157; 403/398
[58] Field of Search .......... 72/379; 29/175 A, 175 R, 29/415, 150; 403/373, 57, 74, 157, 287, 290, 312, 313, 302, 398

[56] References Cited

U.S. PATENT DOCUMENTS

| 1,708,115 | 4/1929 | Baldwin | 29/175 A |
|---|---|---|---|
| 1,770,971 | 7/1930 | Conner | 29/175 A |
| 1,903,863 | 4/1933 | Hayden | 29/175 A |
| 2,067,283 | 1/1937 | Padgett | 29/175 A |
| 2,360,004 | 10/1944 | MacLean, Jr. | 29/415 |
| 3,037,271 | 6/1962 | Schilberg | 29/416 |
| 3,419,942 | 1/1969 | Dunklee | 403/290 |
| 3,501,928 | 3/1970 | Pitner | 464/134 |
| 4,361,024 | 11/1982 | Haldric | 72/379 |
| 4,365,909 | 12/1982 | Stephan | 403/157 |
| 4,433,465 | 2/1984 | Nakano et al. | 29/415 |
| 4,505,608 | 3/1985 | Haldric | 72/379 |
| 4,507,007 | 3/1985 | Mallet | 403/157 |

FOREIGN PATENT DOCUMENTS 1343265 1/1974 United Kingdom ............... 403/157

Primary Examiner—Lowell A. Larson
Attorney, Agent, or Firm—Holman & Stern

[57] ABSTRACT

A process for manufacturing a universal joint mainly by cold forging which comprises a blanking step to punch out a blank having a pair of fork member portions projecting from one side thereof and a hub member portion out of a sheet metal or coiled sheet metal material, a press-working step to form bolt holes on the lug member portions and projections on the opposite side thereof by extrusion, a forming step to bend each root portion of each pair of fork member portions to bring them to a fixed height from the hub member portion, a primary bending step to form the hub member portion into a cylindrical shape, a secondary bending step to project the lug member portions in parallel to each other from said cylindrically shaped hub member portion after completion of the primary bending step, and a press-reforming step to straighten the configuration of the formed product after the secondary bending step.

3 Claims, 16 Drawing Figures

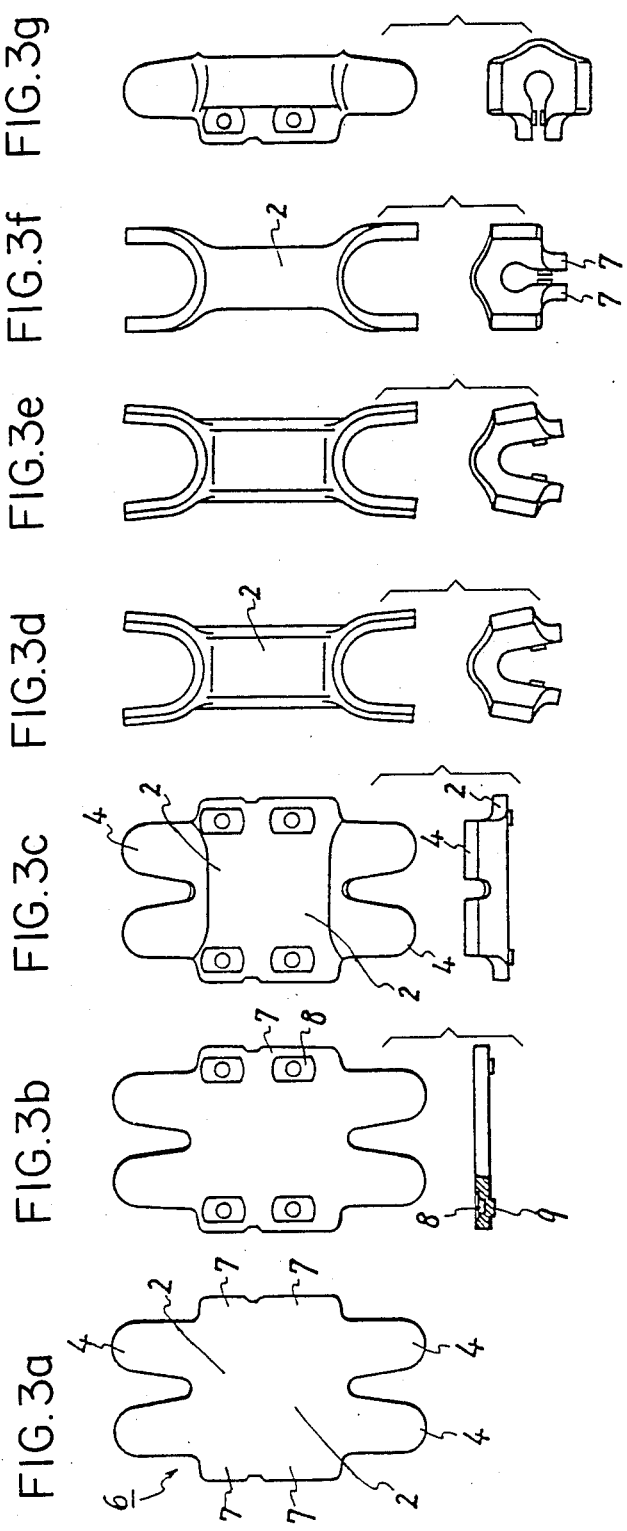

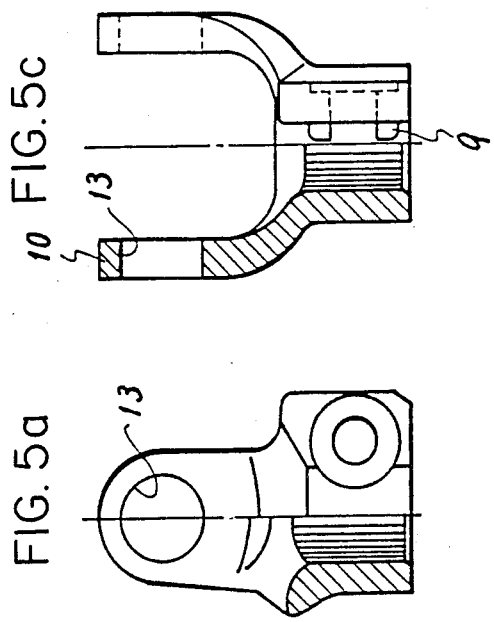
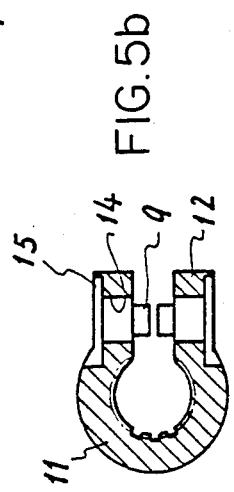
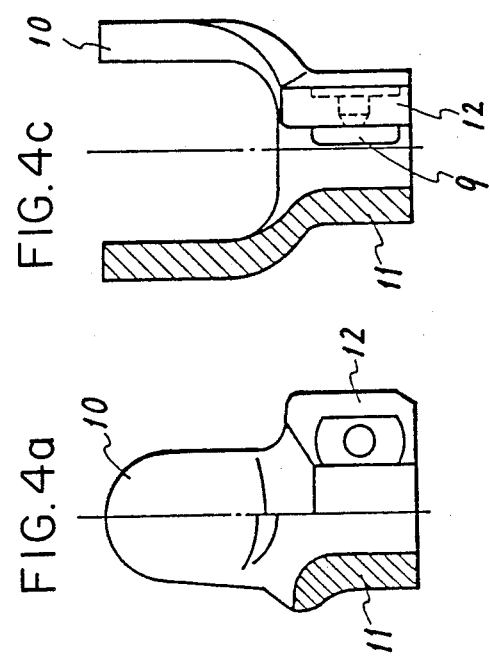
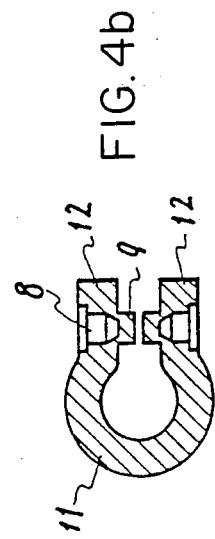

PROCESS FOR MANUFACTURING UNIVERSAL JOINT

BACKGROUND OF THE INVENTION

1. Field of the Invention

The present invention relates to a process for manufacturing a universal joint by cold forging, and more particularly to a process for forming from sheet metal a cylindrical hub to be connected to a rotary driving shaft and a pair of forks facing each other to be connected to a cross-arm.

2. Description of the Prior Art

It has been known in the prior art to manufacture a universal joint from a sheet metal blank by subjecting the same to several processing steps. For example, as shown in FIG. 1 the universal joint has heretofore been formed from a blank 1 which is made as an element of such a universal joint as shown in FIG. 2 by punching it out of the sheet metal and is comprised of a hub member portion 2 to form a cylindrical hub, a pair of bending edge member portions 3 to form lug portions abutted to both edges of the hub member portion 2 and protruding from the cylinder to be bolted to retain the hub in a cylindrical shape, and a pair of fork member portions 4 to form forks extending at right angles from the hub member portion 2 and connecting to both ends of one shaft of the cross arm elements 5 for the universal joint. Then, the hub portion is bent to a cylindrical shape and its inner circumferential surface is spline-milled to make it possible to connect to the rotary driving shaft formed onto the spline shaft. Also, the lug portions to be bolted are bent in order to bore the bolt holes and secure the bolting.

However such a conventional process inevitably further requires two additional steps; one is to bend the bending edge member portions and another is to cut the thus bent-up portions so as not to hinder the spline milling. Furthermore, since the bending edge member portions 3 must be added to both edges of the hub member portion 2, the length of blank 1 naturally becomes long and in consequence, taking an area of fork member portions 4 into consideration, a rate of material utilization in the blanking step becomes considerably low. Thus in the prior art there were some drawbacks such that several extra processes are required and a waste of time and material are brought about.

BRIEF SUMMARY OF THE INVENTION

It is accordingly an outstanding object of the present invention to eliminate the defects of the prior art as outlined above and to provide an improved manufacturing process of a universal joint which is capable of reducing the number of processing steps as compared to a conventional process by making it needless to carry out the heretofore performed bending work by forming the projections by extrusion on each part of the lug member portions in order to reinforce the same and to ensure the tightening of the same to clamp the hub, and further making it needless to perform a preliminary process of spline milling to be applied to the hub inner circumferential surface, while increasing a rate of material utilization by making the blank length smaller than that of a conventional method, and furthermore by making a paired blank by abutting two blanks in the part of each edge of the hub portion.

BRIEF DESCRIPTION OF THE DRAWINGS

The foregoing objects and advantages will be understood more fully by the following detailed description with reference to the accompanying drawings wherein.

FIGS. 3(a) through (g) are plan and corresponding end views showing respectively illustrations of the cold forging process of the invention FIGS. 4(a) through (c) are partial cross-sectional and cross-sectional views showing respectively illustrations of a cold-forged product and its principal part, and FIGS. 5(a) through (c) are views similar to FIGS. 4(a) through (c) showing; respectively illustrations of a cutting-processed final product and its principal part.

DETAILED DESCRIPTION OF THE INVENTION

Figure 1:
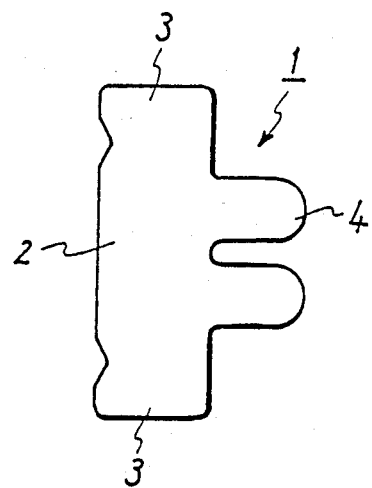
FIG. 1 is a plan view of a blank manufactured by a conventional method.
Figure 2B:
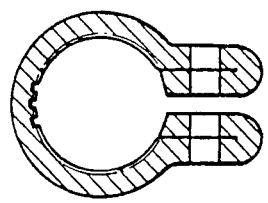
FIG. 2(b) is a cross-sectional view taken along line II—II of FIG. 2(a) of the hub manufactured by a conventional method, respectively.
Figure 2A:
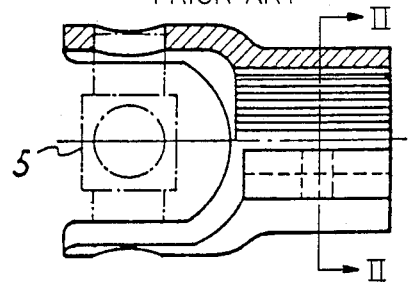
FIG. 2(a) is a partial cross-sectional side elevation view.

The present invention will now be described in further detail as the specific embodiment shown in the accompanying drawings.

In FIG. 3, the blank 6 shown on the diagram (a) is a paired blank in which two hub member portions 2 and 2 are abutted to each other at one edge of their upper and lower parts. Also, the lug member portions 7 and 7 are longitudinally abutted on the right and left edges of the respective hub member portions 2 and 2 in the paired holes. Two pairs of fork member portions 4 and 4 are projected downward and upward from the respective hub member portions 2 and 2. In this example, although the blank 6 is paired to produce two products at one time, there is no hindrance in the subsequent process even if the blank is arranged to produce a single product at one time. The blank 6 may be punched out of sheet metal or coiled sheet metal after being laid out to a shape in such an appropriate state with the use of a press machine. In the 2nd step shown in the diagram (b) of the same drawing, the bolt holes are formed on the lug member portions 7 and 7 and the bottom cavity 8 on the part where it serves as a seat when bolting and at the same time, the projections 9 and 9 are formed on the opposite sides of said seat portions so as to ensure said bolting. The projections 9 have nearly the same length in the upper and lower directions as that of the part serving as a seat of bottom cavity 8. In the 3rd step shown in the diagram (c), the root edge portions of fork member portions 4 are subjected to a bending process to bring the height thereof to a given length from the edge of hub member portion 2. This bending process must be carried out for the purposes of making a space sufficient enough to connect the cross arm between two fork member portions 4 and 4 when bending the hub member portion 2 to a cylindrical shape. In the 4th step shown in diagram (d), the hub member portion 2 will be subjected to a primary bending process in order to form it to a cylindrical shape. In the 5th step shown in the diagram (e), a pressing process will be performed so as to straighten the shape of the workpiece after the primary bending process. In the 6th step shown in the diagram (f), the hub member portion 2 will be subjected to a secondary bending process to bring it to a complete cylindrical shape and at the same time both lug member portions 7 and 7 are bent up to be projected with a nearly parallel relation to each other radialy from the said cylindrically shaped hub. In the 7th step shown in the diagram (g), the final pressing treatment will be made to dress up the shape of the semi-processed product after the secondary bending process in the 6th step. With this, all cold forging steps of the press machine are completed. Accordingly, with the cut out of the thus formed product into two pieces at a fixed position thereof, the final cold-forged product will then be obtained, as shown in FIG. 4.

In FIG. 4, a pair of forks 10 and 10 which are formed by the bending process from the fork member portions 4 are arranged in position opposite to each other at a fixed spacing. Both edges of the cylindrical hub 11 retaining the metal forks 10 and 10 and formed from the hub member portion 2 are positioned to face each other at one position on the radially extending line where the lug member portions 12 and 12 are formed to protrude parallel to each other from the hub portion 11 by the bending process are likewise arranged in position opposite each other. The respective projections 9 and 9 of both lug portions 12 and 12 are also arranged in position face to face at a certain spacing interval as required to form a marginal space for bolting.

Referring finally to FIG. 5, a preferred process to bore the holes 13 on the forks 10 and 10 is therein illustrated in which the cross arm may be pivotted. Then, the bolt holes 14 will be bored in the lug member portions 12 by using the bottom cavity 8 as a guide means and the seats 15 will be alike formed on the same portions. At this time, although a center portion of the projections 9 protruding from the lug member portions 12 may be shaved off due to the boring of aforementioned bolt hole 14, the bolting and its tightening will be ensured because the side portions are still left around the bolt. Then, the inner circumferential surface of the hub 11 will be spline-milled to connect the spline shaft thereto after fixing the hub member portion by using both projections and the bored bolt holes. Thus, each part as the elements of the universal joint is subjected to multifarious processes and integrated as a final product.

As will be understood from the foregoing detailed description of specific embodiments the present invention is characterized by the following advantages:

(1) A reinforcement of the lug portion and a certainty of the bolting can both be attained by forming the projections on the said lug portions by subjecting a part of the same to an extrusion process.

(2) Since the said projections, as noted above, are formed by subjecting a part of the lug member portions to extrusion process, it is possible to omit a bending process to bend the said portion as practiced in the prior art. The lug member portions formed in the blanking process can naturally be made small, thus enabling the blank size to be shortened lengthwise. Accordingly, when punching the blank out of the sheet metal the rate of material utilization can greatly be improved.

(3) Since the projections of lug portions, as noted above, are formed by an extrusion process on both sides thereof facing each other with a bolt hole between, a posture of the lug portions when bolted is stabilized and in consequence the bolting itself becomes strong. This makes it possible to attach the hub stably and exactly to the rotary driving shaft.

(4) Further, according to the process of the present invention, several processing steps can be saved even if a slightly heavy sheet metal is employed in the manufacture of this universal joint. For example, although the fork portions, in conventional processes, are press-worked to form a little concave configuration inward thereon so as to increase a strength of the said portion, the present invention enables eliminating such extra pressing work and assures saving of a number of processing steps.

(5) Furthermore, the present invention provides a process to form a paired blank for user, thereby assuring more effective production and a sharp reduction in cost compared with that of the prior art.

(6) Since all the cold forging steps comprising blanking, bending, forming and extruding are an efficient working process suitable for a consecutive processing, an increase of the productivity can still more be ensured.

Having thus described the invention, what is claimed is:

1. A method of manufacturing a universal joint member comprising:
   blanking a blank out of sheet metal material to form an integrated sheet metal blank having a hub member portion, lug member portions projecting on opposite ends of the hub member portion, and fork member portions projecting from one side edge of the hub member portion at right angles to the direction in which the lug member portions project;
   extruding projections on one face of the blank from the lug portions while simultaneously forming bolt hole cavities in the opposite face of the blank aligned with the projections;
   bending each root portion of the fork member portions to offset the flat fork member portions from the plane of the hub member portion on the same side of said hub member portion;
   forming the hub member portion into a cylindrical shape with the projections on the inner side projecting toward each other; and
   bending the hub member portion, lug member portions and flat fork member portions to form the final configuration of the universal joint member with the lug member and the projections facing each other in closely spaced relationship, and said flat fork member portions extending parallel to each other.

2. The method as claimed in claim 1 and further comprising:
   boring aligned holes through said fork member portions of the formed joint member on an axis at right angles to a plane containing the central axis of the cylindrically shaped hub portion to provide mounting holes for a rotatable cross-arm of a universal joint;
   boring aligned bolt holes through said parallel lug member portions and said projections on an axis extending parallel to the axis of said holes bored in said fork member portions using said bolt hole cavities as a centering guide;
   boring seats on the outer faces of the lug members coaxially with and larger in diameter than said bolt holes; and
   milling spline slots on the inner cylindrical surface of the hub member portion parallel to the central axis thereof.

3. A method as claimed in claim 1 wherein said blanking step comprises simultaneously blanking two said integrated and balanced blanks out of the same sheet material connected together along a common edge of the hub member portions opposite to said side edge from which said fork member portions project so that two mirror image blanks are formed extending from said common edge;

carrying out said extruding, bending and forming steps on said two integrated blanks simultaneously; and after the final bending step severing the formed product along said common edge to produce two like universal joint members.

* * * * *